United States Patent [19]

Stupfel

[11] 3,899,214
[45] Aug. 12, 1975

[54] ANTI-DUSTING BAFFLE FOR FEEDER
[75] Inventor: Clifford L. Stupfel, Portland, Oreg.
[73] Assignee: Rader Companies, Inc., Portland, Oreg.
[22] Filed: Apr. 27, 1973
[21] Appl. No.: 354,993

[52] U.S. Cl. ................................................. 302/49
[51] Int. Cl. ........................................... B65g 53/40
[58] Field of Search ..................... 302/49; 222/194

[56] References Cited
UNITED STATES PATENTS

| | | | |
|---|---|---|---|
| 1,685,331 | 9/1928 | McLaughlin et al. | 302/49 |
| 3,009,744 | 11/1961 | Lenhart | 302/49 |
| 3,085,834 | 4/1963 | Woten et al. | 302/49 |
| 3,224,813 | 12/1965 | Jezo | 302/49 |

Primary Examiner—Allen N. Knowles
Assistant Examiner—Hadd Lane
Attorney, Agent, or Firm—Klarquist, Sparkman, Campbell, Leigh, Hall & Whinston

[57] ABSTRACT

A baffle for a rotary feeder is disclosed for diverting gas trapped in rotor pockets formed by rotor blades away from the loading area of the feeder to prevent the gas from interferring with the gravity feed of material into the rotary feeder and to reduce dusting caused thereby. The baffle is mounted at the leading end of helically arranged rotor blades.

6 Claims, 3 Drawing Figures

PATENTED AUG 1 2 1975  3,899,214

3,899,214

ANTI-DUSTING BAFFLE FOR FEEDER

BACKGROUND OF THE INVENTION

This invention relates to an improvement for a rotary feeder. Rotary feeders are widely used for feeding materials such as flour, coffee, wood chips and the like from a feed bin into a receptacle or conveyor system such as a pipeline which is pressurized with compressed air or other gas.

When used in a pressurized system, the rotary feeder has the advantage of preventing pressure loss in the pipeline by virtue of the rotor blades forming a seal against the rotor housing. Material is carried in rotor pockets formed by the rotor blades from a supply bin into a pressurized pipeline where it is discharged and carried off by the gas flow. The blades continue rotating back to the point at which filling occurs and the cycle continues.

One drawback of rotary feeders in this environment is that gas tends to become trapped in the vacant rotor pockets as the blades rotate from the pressurized pipe back to the supply bin. The trapped gas is released as the rotor pockets are vented into the supply bin causing an upward surge of gas tending to interfere with the gravity feed of the material into the pockets. This may reduce the amount loaded and may also cause excessive dusting.

Prior attempts at solving this problem have included the use of a separate vent opening including duct work for venting the trapped gas prior to allowing the blades to enter the supply vent. This, however, increases the complexity of the rotary feeder and may reduce its filling capacity. An example of this construction is disclosed in U.S. Pat. No. 2,757,049.

OBJECTS

It is an object of the present invention to provide a rotary feeder free from the filling problems associated with venting of gas trapped in the rotor pockets into the supply bin.

It is another object of the present invention to provide an anti-dusting baffle for a rotary feeder capable of venting gas trapped in rotor pockets away from the feeder loading area to avoid dusting problems during the filling of said pockets.

It is a further object of the present invention to provide a diverting channel for a rotary feeder capable of diverting gasses trapped in the rotor pockets of said feeder away from the loading area.

SUMMARY OF THE INVENTION

According to the present invention the problems caused by gas trapped in the rotor pockets escaping into the supply bin are avoided by employing an anti-dusting baffle means on the rotor housing. The baffle means is provided at the leading end of the rotor blades which are helically arranged. The baffle means does not obstruct proper filling of the rotor pockets nor decrease their capacity but serves to vent the trapped gas by changing the vertical flow of the gas as it is released from the rotor pockets into a horizontal flow in a direction substantially parallel to the rotor blades and away from the leading end.

DRAWINGS

DETAILED DESCRIPTION

Figure 1:
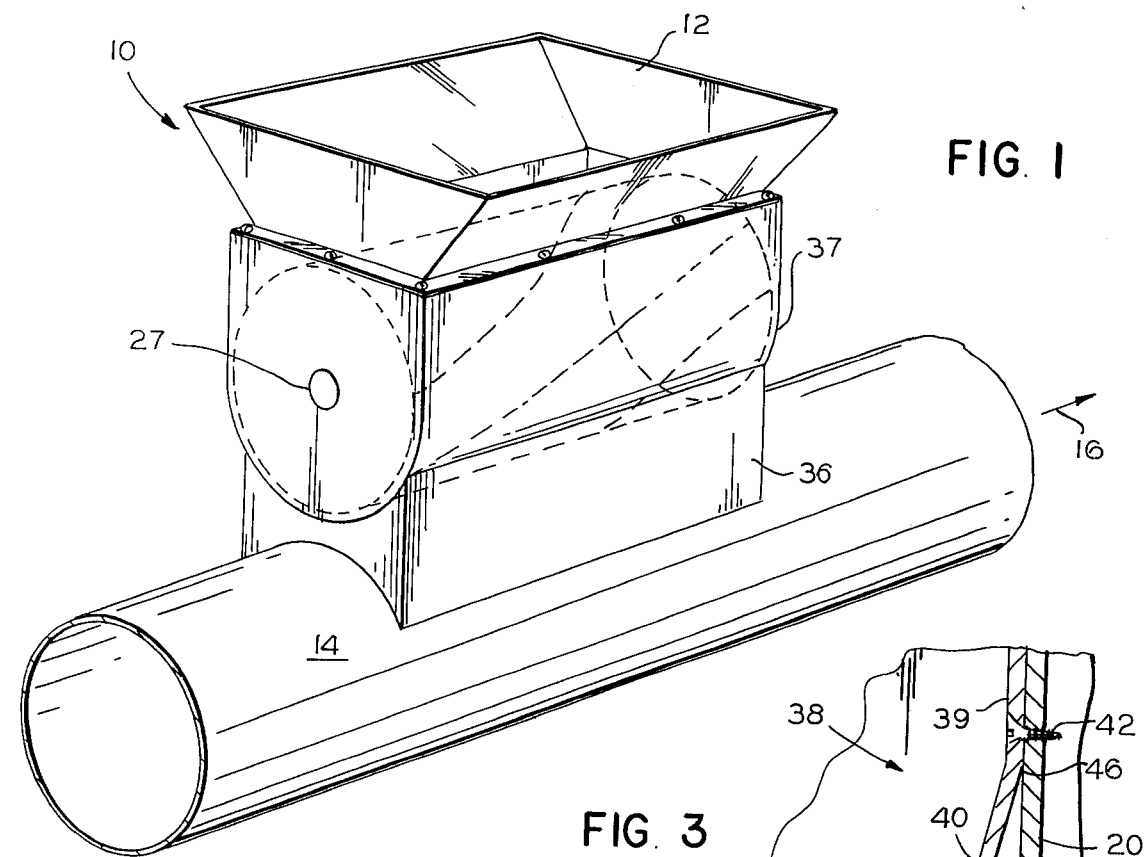
FIG. 1 is a perspective view of a rotary feeder employed in a pressurized gas conveyor system.

Referring to FIG. 1, there is shown a rotary feeder 10 employed in a pressurized gas conveyor system. The rotary feeder receives material from a supply bin 12 and discharges it into a pressurized pipeline 14 which conveys the material away from the feeder in the direction indicated by arrow 16.

Figure 2:
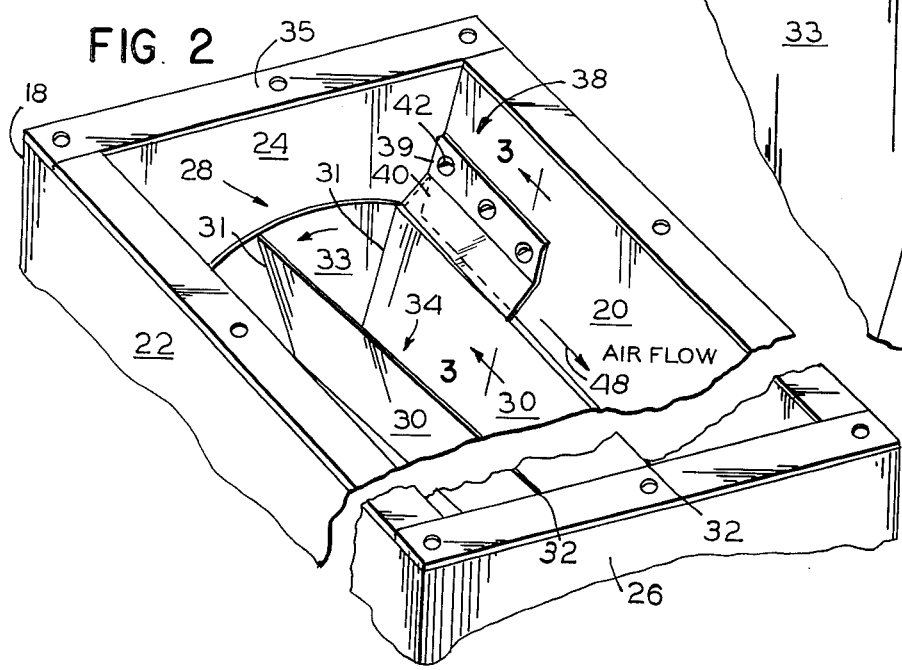
FIG. 2 is a partial elevation view of the housing for the rotary feeder showing the positioning of the anti-dusting baffle means with respect to the rotor blades.

As seen in FIG. 2, the rotary feeder 10 includes a housing 18 having side walls 20 and 22 and end walls 24 and 26. Mounted for rotation within the housing on a bearing shaft 27 journaled in end walls 24 and 26 is a rotor cylinder 28 driven by a motor (not shown). The cylinder 28 has a plurality of rotor blades 30 extending radially outwardly. The blades 30 are arranged helically on the cylinder so that blade ends 31 lead the other or trailing ends 32 during rotation of the cylinder. An end disc 33 is mounted on the cylinder perpendicular to and flush with the leading ends 31 of the blades 30. A similar end disc (not shown) is mounted flush with the trailing ends 32. The triangular sections defined by the blades 30 and the end discs form rotor pockets 34 in which material is carried.

The housing 18 is adapted to engage the supply bin 12 along its top surface 35. As illustrated in FIG. 1, the lower portion 36 of the feeder 10 communicates with the pipeline 14 through an appropriate opening therein.

Typical operation of a conventional rotary feeder thus far described is as follows: The rotor blades 30 rotate in the direction shown in FIG. 2 until a leading end 31 of a blade 30 clears the wall 20. This exposes a small portion of rotor pocket 34 to the supply bin 12. As the blade progresses further, a successively larger portion of the rotor pocket is exposed to the supply bin containing the material to be loaded. The material begins to fall into the rotor pocket 34. The pocket continues to rotate across the supply bin opening taking on additional material. Further rotation carries the pocket down along the curved portion 37 of the feeder 10 until it reaches the pipeline opening. The material in the pocket is then discharged into the pipeline and the empty pocket continues around until it once again is positioned to receive material from bin 12.

Interferring with the gravity feed from bin 12 is the venting into the supply bin 12 of high pressure gas trapped in the rotor pocket. This gas is trapped in the empty rotor pockets as they rotate from the pipeline to the supply bin. As the leading end 31 of each rotor blade clears the side wall 20, the gas vents upwardly tending to blow the material to be loaded away from the rotor pocket, causing delay and uneven filling of the pockets. Also, considerable dusting occurs. The result is a decrease in the efficiency of the rotary feeder due to smaller amounts of material being deposited in the rotor pockets.

Figure 3:
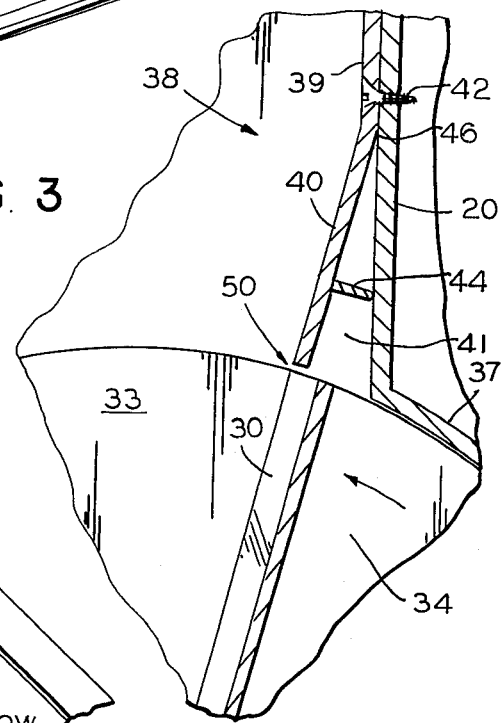
FIG. 3 is a sectional view taken along the line 3—3 of FIG. 2.

According to a preferred embodiment of the present invention, this drawback is overcome by employing a baffle means indicated generally by numeral 38. The baffle means in conjunction with the housing wall 20 form a diverting channel 41 (FIG. 3) which acts to prevent the gas from venting upwardly into bin 12. As shown in FIGS. 2 and 3, the baffle means 38 comprises a generally rectangular plate secured to the side wall 20, having two segments 39 and 40. The segment 39 is mounted flush with the side wall 29 by a plurality of screws 42. The lower segment 40 is angularly displaced from the segment 39 so as to form an acute angle with the side wall 20 as best seen in FIG. 3. Extending perpendicularly from the segment 30 along its length is a spacing member 44. Member 44 serves to position the segment 40 at a selected minimum distance from the wall 20.

The baffle means 38 is positioned above the rotor blades 30 along the leading end 31 so that the segment 40 clears the upper portion of the blades by only a small fraction of an inch. The baffle means is flush against the end wall 24 and extends a distance of approximately one-third the length of the rotor blades along the side wall 20 for reasons that will be explained. It is preferably formed of a relatively rigid mild steel although other materials are suitable.

When the leading end 31 of a rotor blade 30 rotates past the side wall 20, the escaping gas trapped in the following rotor pocket will be diverted side-wise by the baffle segment 40 toward the trailing blade end 32. The gas can then diffuse through the supply bin without causing any filling or dusting problems. It has been found that by the time approximately one-third of the rotor blade has cleared the wall 20, all of the gas pressure trapped in the rotor pocket 34 will have been vented. Thus, the baffle means 38 need not extend more than approximately one-third the length of the rotor blades.

By the time a blade clears the segmented portion 40 of the baffle means, substantially all of the gas trapped in the following rotor pocket will have been released and diverted away from the supply bin opening. Each rotor pocket can then receive material from the supply bin substantially free of gas venting and dusting problems and will take on larger quantities of material than would be possible in the presence of gas venting upwardly into the supply bin.

Referring to FIG. 3, it will be seen that a small clearance 50 is maintained between the lower portion of the segment 40 and the upper edge of the rotor blade 30, just sufficient to allow proper rotation of the blades while not permitting substantial amounts of gas to pass therethrough.

I claim:

1. A rotary feeder for feeding material from a supply bin into a pressurized gas pipeline comprising:
    a rotor housing communicating with said bin and said pipeline,
    a rotor cylinder mounted in said housing and having a plurality of helical blades mounted thereon, each of said blades having a leading and trailing edge, said blades defining rotor pockets which carry material from said bin to said pipeline during rotation of said blades,
    and baffle means provided on said housing adjacent to and along a relatively short distance of the leading edges only of said helical blades for diverting gas trapped in said pockets, said baffle means directing said trapped gas substantially horizontally toward said trailing edges and then releasing said gas for upward motion as said pockets open into said bin thereby preventing interference with the filling of said pockets with the material in said bin.

2. A rotary feeder according to claim 1 wherein said baffle means comprises a plate secured to said housing.

3. A rotary feeder according to claim 2 wherein said plate comprises:
    a first vertically mounted segment,
    a second segment angularly displaced from the vertical direction extending obliquely downwardly, and
    a spacing member on said second segment, perpendicular thereto, for spacing the second segment from said housing to thereby form a diverting channel between said housing and the second segment.

4. A rotary feeder according to claim 1 wherein said baffle means and said housing form said diverting channel into which said gas is vented, its flow being changed from vertical to horizontal and in a direction toward said trailing ends.

5. A rotary feed according to claim 2 wherein said plate extends approximately one-third the length of the rotor blades from a point opposite the leading edges thereof toward the trailing edges thereof,
    the diverting channel formed thereby being open ended in the direction toward said trailing edges.

6. A rotary feeder for feeding material from a supply bin into a pressurized gas pipeline comprising:
    a rotor housing communicating with said bin and said pipeline,
    a rotor cylinder mounted in said housing and having a plurality of helically arranged rotor blades mounted thereon, each blade having a leading and trailing end, said blades defining rotor pockets which carry material from said bin to said pipeline during rotation thereof,
    a baffle means provided on said housing extending approximately one-third the length of said rotor blades and over the leading end portion of such blades and constituting a diverting channel opening at its inner end into said bin causing gas trapped in said pockets from venting directly upwardly into said supply bin at the said end of said channel as said leading end portions rotate into said bin to open said pockets,
    said means including a first vertically mounted segment, a second segment angularly displaced from the vertical extending obliquely downwardly and a spacing member on said second segment, perpendicular thereto, for spacing the second segment from said housing to thereby form said diverting channel between said housing and said second segment to cause escaping gas to flow horizontally along the side of the supply bin at the end of said channel.

* * * * *